United States Patent [19]

Inui et al.

[11] 4,161,227

[45] Jul. 17, 1979

[54] TRANSMISSION GEAR FOR A VEHICLE OF THE TYPE HAVING A SWIVELLING UPPER STRUCTURE WITH RESPECT TO AN UNDERCARRIAGE

[75] Inventors: Takayasu Inui, Osaka; Satoru Nishimura, Hirakata, both of Japan

[73] Assignee: Kabushiki Kaisha Komatsu Seisakusho, Tokyo, Japan

[21] Appl. No.: 836,707

[22] Filed: Sep. 26, 1977

Related U.S. Application Data

[63] Continuation of Ser. No. 645,349, Dec. 30, 1975, abandoned.

[30] Foreign Application Priority Data

Jun. 30, 1975 [JP] Japan .................................. 50/91397
Jun. 30, 1975 [JP] Japan .................................. 50/91398

[51] Int. Cl.² ...................... B60K 17/02; B62D 11/02
[52] U.S. Cl. .................................. 180/70 R; 180/6.58; 180/77 R
[58] Field of Search ..................... 180/6.58, 6.6, 77 S, 180/79.4, 79.5, 70 R; 212/38, 66-70

[56] References Cited

U.S. PATENT DOCUMENTS

| 1,540,327 | 6/1925 | Greenleaf .................. 180/6.58 X |
| 1,710,322 | 4/1929 | Russell ..................... 180/6.58 X |
| 2,266,651 | 12/1941 | McLean ..................... 212/68 X |
| 2,604,175 | 7/1952 | Burdick et al. ............... 180/6.58 |
| 3,480,156 | 11/1969 | Pensa ....................... 212/38 |

*Primary Examiner*—Joseph F. Peters, Jr.
*Assistant Examiner*—Donn McGiehan
*Attorney, Agent, or Firm*—Armstrong, Nikaido, Marmelstein & Kubovcik

[57] ABSTRACT

A transmission gear for a vehicle of the type having a swivelling upper structure with respect to an undercarriage which comprises an input gear rotatably mounted on the upper structure, the input gear being connected to a prime mover, an output gear rotatably mounted on the undercarriage and, an idler gear mounted coaxially with a center swivel joint of the swivelling upper structure and the undercarriage.

2 Claims, 8 Drawing Figures

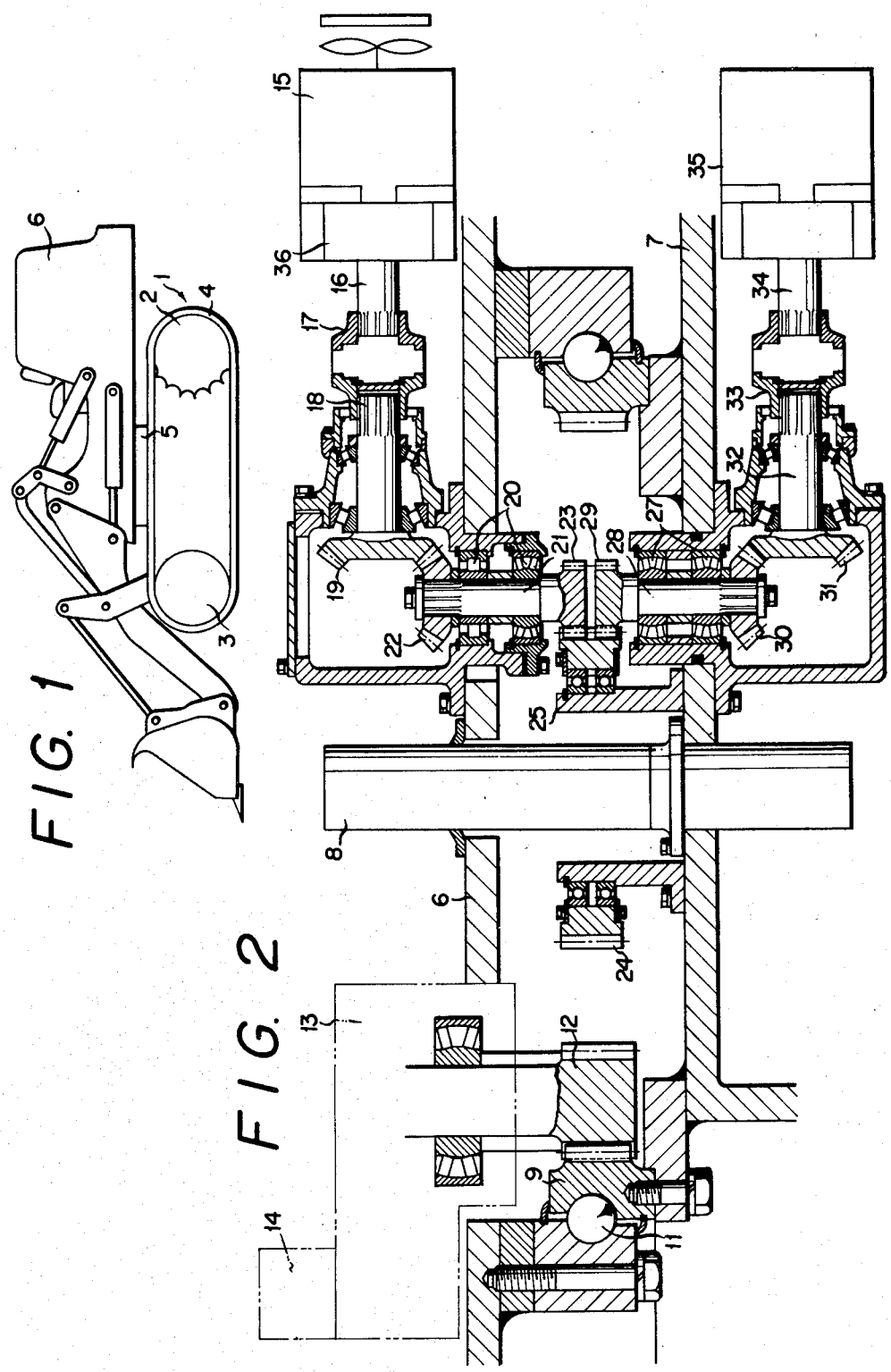

TRANSMISSION GEAR FOR A VEHICLE OF THE TYPE HAVING A SWIVELLING UPPER STRUCTURE WITH RESPECT TO AN UNDERCARRIAGE

This is a continuation, of application Ser. No. 645,349, filed Dec. 30, 1975 now abandoned.

BACKGROUND OF THE INVENTION

The present invention relates to a power transmission gear for a vehicle of the upper structure swiveling type which has a vehicle body mounted on an undercarriage in such a manner as to be free to swivel.

The conventional power transmission gear for a vehicle of this category, such as a power shovel or the like, is either of the hydraulically driving system type wherein power generated by an engine set in place on a vehicle body is converted into hydraulic pressure and transmitted from a swiveling center to an undercarriage through a swivel joint, with the hydraulic pressure thus transmitted being further converted into power for traveling, or of the mechanically driving system type wherein power generated by an engine set in place on a vehicle is transmitted from a swiveling center to an undercarriage through a bevel gear.

However, in the case of the former systems, a common defect therein has been that conversion of power into hydraulic pressure results in deterioration in efficiency of power transmission, as well as the fact that employment of a hydraulic device is costly, deteriorates reliability and increases durability, and incapability of transmitting a high level of power, hence there is an inherent defect of limitation in terms of the size of a vehicle; while in the case of the latter system, common a defect therein has been that transmission of power from the swiveling center results in an increase in the size of the center swivel joint for controlling travel, an increase in swiveling and sliding resistance, early abrasion of an O-ring, and a drastic limitation on the arrangement of respective apparatuses on the vehicle body. Also, such arrangement of a swivel driving gear and a travel driving gear in an independent and separate manner makes the synchronized operation thereof impracticable.

SUMMARY OF THE INVENTION

It is, therefore, an object of the present invention to provide a transmission gear for a vehicle of the type having a swivelling upper structure with respect to undercarriage in which power is transmitted mechanically without a swivelling center.

It is another object of the present invention to provide a transmission gear for a vehicle of the type described above in which the noise from rotation of the transmission gear is reduced significantly by terminating rotation of such a transmission gear.

It is another object of the present invention to provide a transmission gear for a vehicle of the type described above in which a smooth gear engagement is obtained in the transmission gear, resulting in good durability of the transmission gear such that it is free from noise. A transmission gear of the present invention comprises an input gear rotatably mounted on the upper structure of the vehicle, the input gear being connected to a prime mover, an output gear rotatably mounted on the undercarriage of the vehicle and, an idler gear mounted coaxially with a center swivel joint of the swivelling upper structure and the undercarriage.

The aforementioned construction introduced in the present invention well enables the power generated by a prime mover arranged in place on the swivelling upper structure to be transmitted mechanically to the drive wheels of the undercarriage in a proper manner, completely free from passing through the swivelling center. Therefore, the power can be transmitted mechanically, without the difficulty of increasing the diameter of the center swivel joint.

Therefore, the transmission gear introduced in the present invention has the following features and advantages:

(1) Power can be transmitted in a highly efficient and effective manner.

(2) No hydraulic device is required for the transmission of power, hence the resulting improvement in reliability and durability; also there is transmissibility of a higher level of power. Therefore, the transmission gear introduced in the present invention can be properly fitted in place completely free from being subjected to any limitation in terms of the size of a vehicle.

(3) The diameter of the center swivel joint is not required to be increased, hence the resulting reduction in swivelling and sliding resistance; reduction in abrasion of an O-ring, and no limitation on the arrangement of respective assemblies to be set on the swivelling upper structure.

(4) Power is not transmitted through the swivel center, wherefor the swivelling upper structure is kept free from being affected by a torque from the reaction force of the transmitting power in the relation thereof with the undercarriage, hence no mechanism is required for preventing rotation.

Other objects, features and advantages of the present invention will be readily apparent from the following description taken in conjunction with the accompanying drawings.

BRIEF DESCRIPTION OF THE DRAWINGS

FIG. 1 is an outlined side view of a tractor furnished with the transmission gear introduced in the present invention, FIG. 2 is a sectional view of the transmission gear introduced in the present invention, with a key section shown in an enlarged scale.

DETAILED DESCRIPTION OF THE PREFERRED EMBODIMENTS

Figure 3:
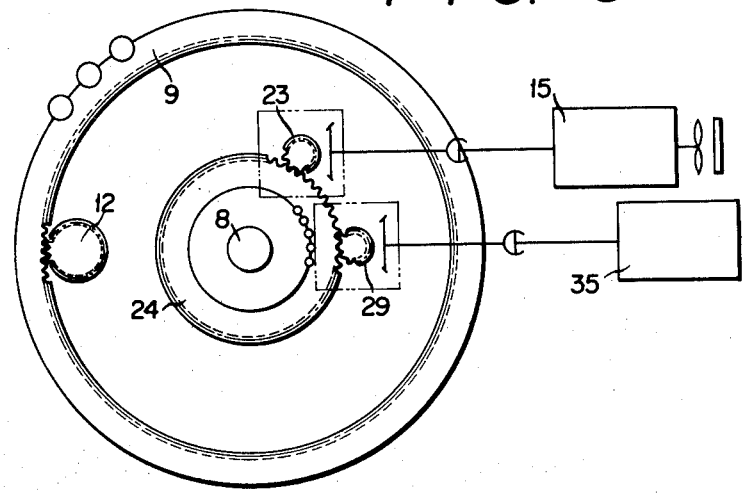
FIG. 3 is an outlined plan of what is shown in FIG. 2, and FIGS. 4 through 8 are diagrammatical outlined explanatory drawings of respectively different illustrations.

Reference is invited to FIG. 1, wherein an undercarriage 1 is of a construction such that an endless track 4 is set in place on a drive wheel 2 and a floating wheel 3 is located over a spacing, and the undercarriage 1 has an upper structure or vehicle body 6 arranged thereon in such a manner as to be free to swivel through a swivelling mechanism 5.

The said swivelling mechanism 5 is of a construction such as is shown in FIG. 2, wherein a center swivel joint 8 is fixed upright in place on a frame 7 of the undercarriage 1, an annular internal gear 9 is fixed in such place in a manner as to be concentric with the said center swivel joint 8, and the upper vehicle body 6 is properly borne in place on the outer peripheral section of the annular internal gear 9 through a swivel bearing 11 in such a manner as to be free to swivel. The upper vehicle body 6 has a swing pinion 12 set in place thereon, and the said swing pinion 12 is engaged with the said annular internal gear 9, and is connected with a motor 14 through swing mechanism 13.

Numeral 15 represents a power source set in place on the upper vehicle body 6, an output shaft 16 thereof is connected with a bevel gear shaft 18 through a universal joint 17, a bevel gear 19 on the bevel gear shaft 18 is engaged with a bevel gear 22 wedged in place on the upper end of a vertical shaft 21 and is so arranged eccentrically from the center swivel joint 8 on the upper vehicle body 6 through a bearing 20 as to be capable of swivelling, and the vertical shaft 21 has an input gear 23 properly fixed in place by wedging on the lower end thereof. The said input gear 23 is engaged with an idler gear 24, the said idler gear 24 is externally fitted in place on, and borne by, a cylindrical fitting member 25 which is arranged concentrically with the center swivel joint 8 on the frame 7 of the undercarriage 1 through a bearing 26 in a manner so as to be free to swivel, and the said idler gear 24 has an output gear 29 wedged in place on a vertical shaft 28 borne on the frame 7 through a bearing properly engaged therewith. The vertical shaft 28 is so designed as to transmit the power to a bevel gear shaft 32 through a bevel gear 30 and a bevel gear 31, the bevel gear shaft 32 is connected with a drive shaft 34 through a joint 33, and the drive shaft 34 is so designed as to transmit the power to the said driving wheel 2 through a power transmitting section 35 which comprises a transmission, a directional control clutch, and a final speed reduction gear.

Next, a description of the operation will be given below:

When the power source 15 is driven, the output shaft 16 is rotated, thereby rotating vertical shaft 21 through bevel gears 19,22 whereby the idler gear 24 is caused to rotate through the input gear 23. When the idler gear 24 is thus rotated, the output gear 29 is rotated, and the vertical shaft 28 is also rotated, whereby the bevel gear shaft 32 is caused to rotate through the bevel gears 30, 31. When the bevel gear shaft 32 is thus caused to rotate, the rotation thereof is transmitted to the power transmission mechanism 35 through the drive shaft 34, to thus rotate the drive wheel 2 until the undercarriage 1 is caused to start traveling.

And, in the case of swivelling the upper vehicle body 6, the only thing required therefor is to rotate the swing pinion 12. In this case, the input gear 23 is caused to rotate around the idler gear 24; however the rotation thereof is absorbed by a torque converter 36, and is not transmitted to the power transmission mechanism 35; therefore, the upper vehicle body 6 is caused to swivel around the annular internal gear 9 through the swivel bearing 11, irrespective of the power transmission mechanism 35. Now in further relation to the power transmission gear introduced in the present invention, the driving gear for swivelling and the driving gear for travelling are independent and separated from each other and both can be put in to simultaneous and synchronized operation.

Figure 4:
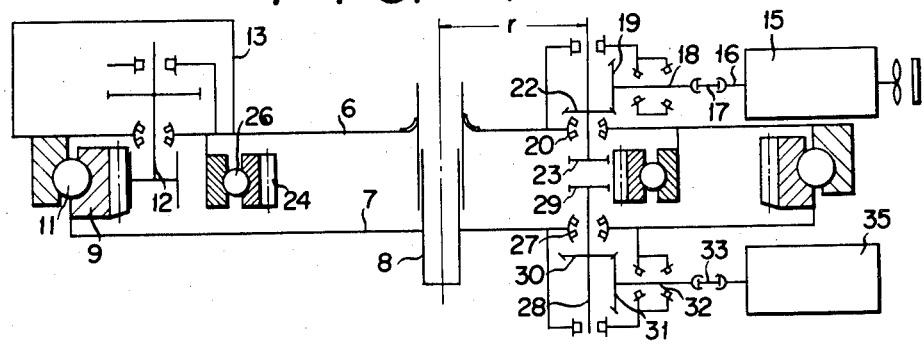

Further, where the idler gear 24 is selected so as to be an annular internal gear, it is caused to be supported on the vehicle body 6 through the bearing 26, and the said idler gear 24 is further caused to be engaged with both the input gear 23 and the output gear 29, in the construction thereof, so that the space $\gamma$ between the center swivel joint 8 and the vertical shafts 21, 28, respectively, can be reduced, as shown in FIG. 4.

Figure 5:
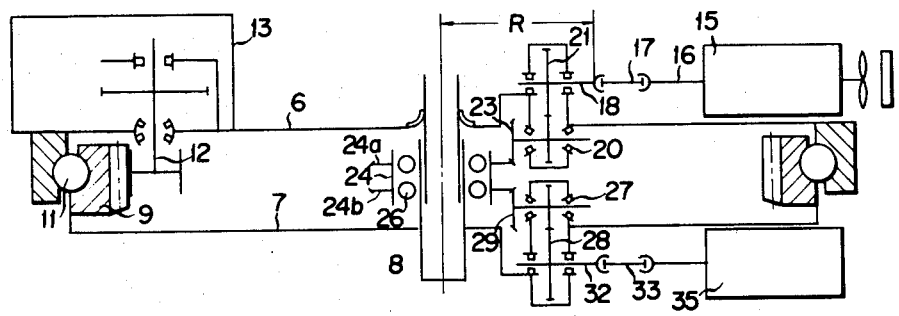

Furthermore, where the idler gear 24 is so formed as to be constructed of a pair of upper and lower bevel gears 24a, 24b, the idler gear 24 is also formed so as to be externally fitted in place on, and supported by, the said center swivel joint 8 through the bearing 26 in a manner so as to be free to rotate, and a bevel gear is so selected as to be the input gear 23 and the output gear 29, respectively, then the input gear 23 and the output gear 29 are so formed as to be engaged with the said pair of bevel gears 24a, 24b, respectively, in the construction thereof, as shown in FIG. 5, with the space R between the universal joint 17 and the center swivel joint 8 being reduced.

Figure 6:
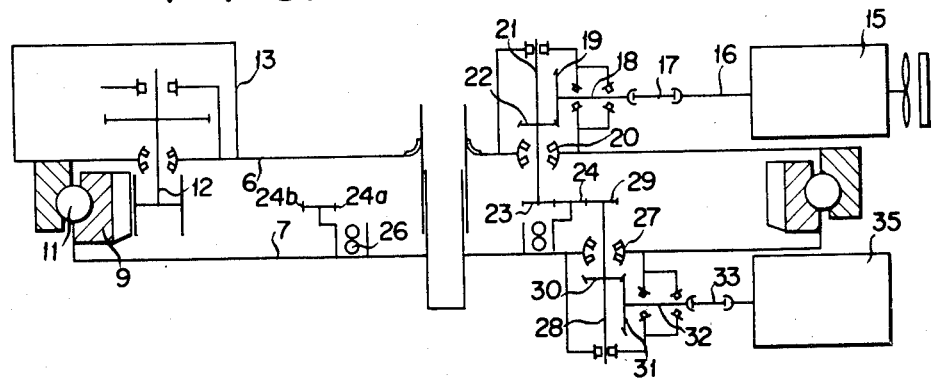

Moreover, where the idler gear 24 is formed with annular internal gear teeth 24a and external gear teeth 24b in the construction thereof, and, the input gear 23 and the output gear 29 are so constructed as to be engaged with the internal teeth 24a and the external teeth 24b of the idler gear 24, respectively, as shown in FIG. 6, a reaction force from excavation as occurs on the vehicle body when a thrust excavation or the like is absorbed, such is extinguished by the input gear 23 and the output gear 29, and hence no influence on the dler gear 24 occurs; wherefor, the capacity of the bearing 26 of the idler gear 24 can be reduced accordingly.

Figure 7:
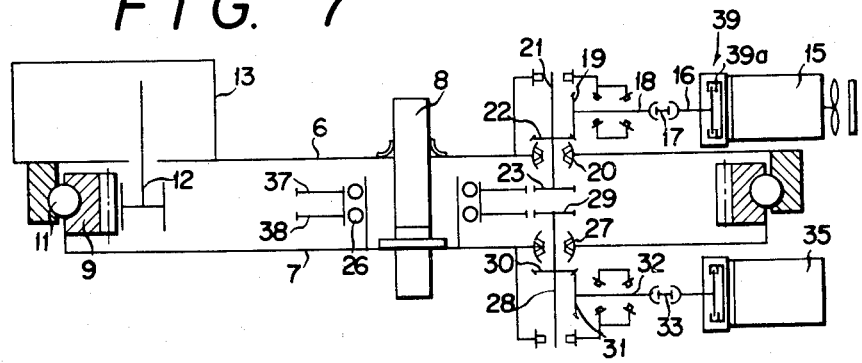

Shown in FIG. 7 is another illustration of the present invention, wherein a main clutch 39 is interposed between the output side of such an engine 15 as is mounted on a swivelling upper structure 6 and a gear train that transmits the power of the said engine 15 to a power transmission mechanism 35, with torque converter on the undercarriage 1. The output shaft of the engine 15 thus connected with the output shaft 16 through the main clutch 39. Reference numerals 37 and 38 are gears, and are engaged with the input gear 23 and the output gear 29, respectively. In this category of construction, the main clutch 39 is offset except during traveling of the vehicle, whereby transmission of power is shut off, and rotation of the transmission gear is suspended, and power loss in the engine is thereby prevented, so that noise generated the rotation of the transmission gear can be eliminated.

Figure 8:
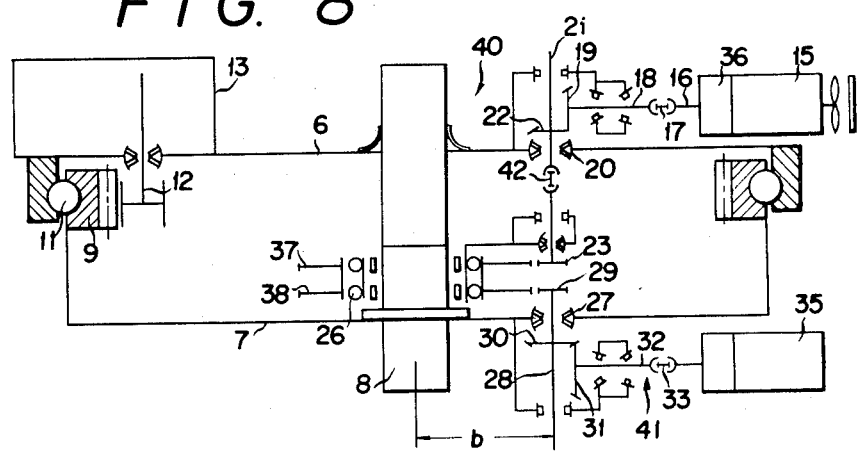

Shown in FIG. 8 is still another illustration of the present invention, wherein a transmission gear that transmits the power generated by an engine 15 is set in place on the swivelling upper structure 6 of a torque flow transmission arranged in place on an undercarriage 1 and is divided into an upper transmission gear 40 to be arranged in place on the swivelling upper structure 6 and a lower transmission gear 41 to be arranged in place on the undercarriage 1, such that the upper transmission gear 40 and the lower transmission gear 41 are connected with each other through a universal joint 42. In the case of this category of construction, deviation of the swivelling upper structure 6 and the undercarriage 1 from each other is properly absorbed by the universal joint 42; therefore, the engaging contact of the respective gear teeth between the said transmission gears is improved, whereby the durability thereof is improved, and noise is properly prevented from being generated.

What is claimed is:

1. In a construction vehicle of the type having an undercarriage with an endless track and a swivelling upper structure pivotally mounted through thrust bearing means on said undercarriage, the combination of:

an engine for use in moving the vehicle mounted on said upper structure and connected through transmission gear means to said endless track, said transmission gear means comprising an input gear rotatably mounted through a bearing on said upper structure, eccentrically from the swivelling axis of the upper structure, an output gear rotatably mounted through a bearing on said undercarriage eccentrically from said swivelling axis and an idler gear mounted in a manner such as to be free to rotate with respect to said undercarriage by the interposition of a bearing on said undercarriage coaxially with said swivelling axis and arranged between said undercarriage and said upper structure wherein said input and output gears are rotatably engaged with each other by the interposition of said idler gear;

an annular internal gear fixedly secured to said undercarriage in a manner such as to be concentric with said swivelling axis and on the outer peripheral surface of which is mounted said thrust bearing means;

a swing means mounted on said upper structure and comprising a swing pinion rotatably engaged with said annular internal gear; and a motor for use in swivelling said upper structure with respect to said undercarriage mounted on said upper structure and connected to said swing pinion of the swing means whereby the travelling operation of the vehicle and the swivelling operation of the upper structure are independent of, and separate from, each other, while being simultaneously and synchronously performed.

2. A transmission gear of claim 1, wherein a clutch is provided between an output of the prime mover and the transmission gear.

* * * * *